March 24, 1931.    C. B. FRANKLIN ET AL    1,797,722
HEAD BRACKET FOR MOTOR CYCLE FRAMES
Filed April 4, 1929    2 Sheets-Sheet 1

INVENTOR.
Chas. B. Franklin
and William C. Tronk
BY
Chapin & Neal
ATTORNEYS.

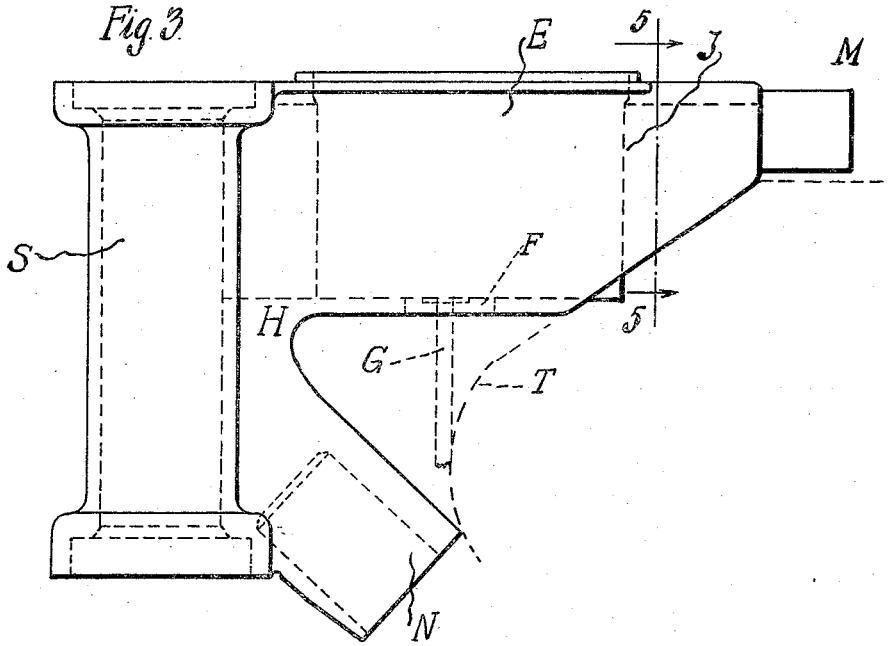
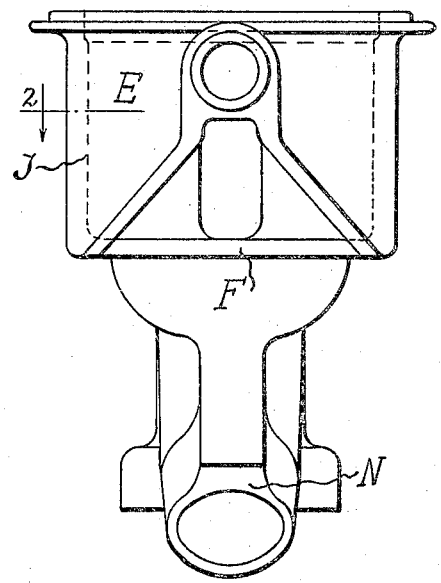
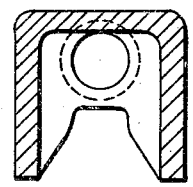

Patented Mar. 24, 1931

1,797,722

UNITED STATES PATENT OFFICE

CHARLES BAYLY FRANKLIN AND WILLIAM CHRISTIAN FRONK, OF SPRINGFIELD, MASSACHUSETTS, ASSIGNORS TO INDIAN MOTOCYCLE COMPANY, OF SPRINGFIELD, MASSACHUSETTS, A CORPORATION OF MASSACHUSETTS

HEAD BRACKET FOR MOTOR-CYCLE FRAMES

Application filed April 4, 1929. Serial No. 352,565.

This invention relates to an improved construction of bicycle frames, particularly of motorcycles, for the more convenient mounting of an instrument such as a speedometer in the frame of such a vehicle, and has for its purpose to provide a structural element which can be inexpensively manufactured and easily assembled in the frame, which does not unduly interfere with other structural parts of the vehicle and which permits the positioning of the instrument in a place where it will sufficiently be protected, easily be connected to the driving mechanism, and lie within convenient range of vision for the rider.

In the prior art, solutions with similar objects in mind have been tried, but, to our knowledge, an arrangement as disclosed in the following specification, which answers all the before-mentioned features very satisfactorily, has never before been known or used.

In the drawings:

Fig. 1 shows in elevation part of a motorcycle frame with a steering head bracket according to our invention adapted to receive a speedometer;

Fig. 2, upper part, is a plan view of the steering head bracket; lower part, a section on line 2 of Fig. 4;

Fig. 3 is a side view of the steering head bracket indicating the end of a flexible driving shaft for a speedometer in dotted lines;

Fig. 4 is a rear view of the steering head bracket; and

Fig. 5 is a section through the steering head bracket on line 5—5 of Fig. 3.

Figure 1:
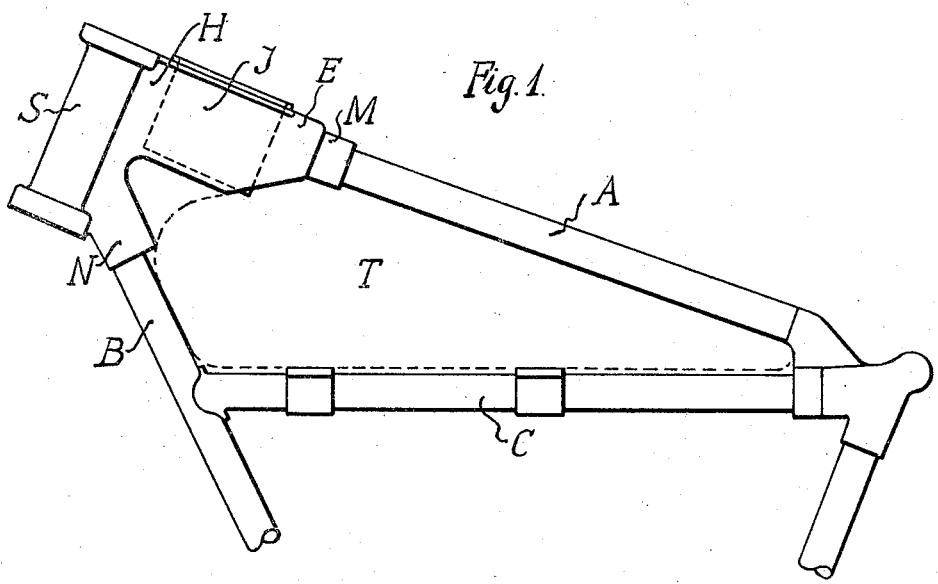
Figure 2:
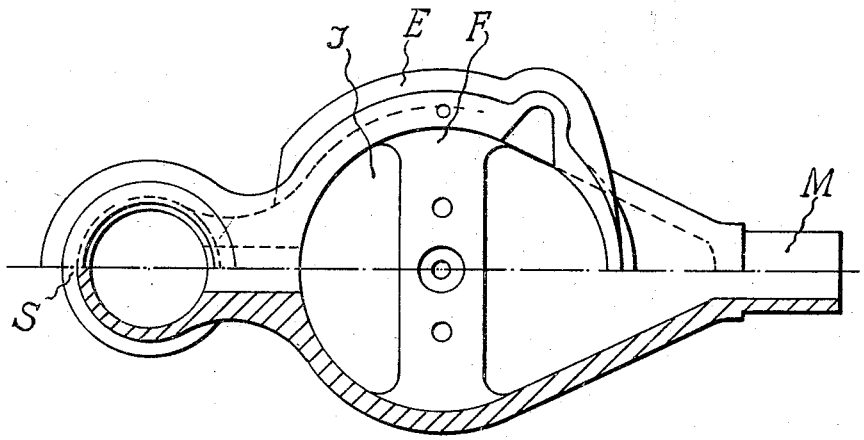

Referring more particularly to the drawings, the frame of the cycle (only the forward part of which is shown) follows in general outline the usual construction of such frames and comprises the head bracket H, top bar A, lower bar B, and intermediate bar C. As is common in motorcycle frames, the gasoline tank T is carried within the space, indicated by a dotted line, between the top bar A, head H and intermediate bar C.

The steering head bracket H is of special construction but is so designed that it may be conveniently made of one integral piece either by forging or casting in the same manner as heretofore. This bracket H comprises the head portion S for the usual front fork bearing and lower extension N for permanent attachment in the usual manner to the lower bar B of the frame. From the upper head portion of the bracket there is formed an integral extension E which differs materially from the usual construction in that it is longer than is customary and is formed into a bifurcated portion with circularly curved sides adapted to provide a receptacle J for an instrument mounting such as a speedometer. The curved sides of said extension E are made sufficiently deep to embrace and laterally shield the speedometer casing in a satisfactory manner, as shown in Figs. 3 and 4. Across the bottom of said sides is a bridge member F serving as the floor for said receptacle. It will be understood that the speedometer or other instrument mounted in said receptacle will preferably be designed to have its face lie substantially flush with the top of the sides E when its bottom rests on the bridge member F. The rear end of said extension E converges into a spud M for permanent attachment in the usual manner to the top bar A.

When a speedometer or other instrument operative from some moving part of the cycle is mounted in the receptacle J of the extension E, a flexible driving shaft for said instrument may extend thereto from any suitable direction.

From the foregoing, it will be observed that a suitable mounting has been provided for a speedometer, wherein its face may lie substantially flush with the top of the frame and without the necessity of extra parts or attachments. This is a great advantage over other former arrangements in which the speedometer was mounted in a separate strut portion intermediately placed in the top bar and fixed to it by two additional joints. The structure, according to this invention, can be inexpensively manufactured and assembled without such additional joints. The face of the instrument may be said to be in an ideal position in respect to convenience of observation.

If properly shaped to conform to the outlines of the gasoline tank, the present structure will only immaterially influence the shape of the gasoline tank and negligibly reduce its content. On the other hand, a very desirable protection of the tank against frontal collisions is afforded by the structure of the head bracket which represents a strong natural shield for such frontal impacts, the effectiveness of which may be further increased by extending its lower and lateral portions with a view to such protective qualities.

It is evident that the structure shown in the drawings may be modified in various details without departing from the scope of the invention as hereinafter claimed.

What we claim is:

1. A head bracket for cycle frames comprising a head portion and integral therewith an upper extension for attachment of the frame top bar and a lower extension for attachment of the bottom bar of said frame, the upper extension being bifurcated between said head and top bar attachment so as to provide a receptacle for an instrument casing, the branches of said bifurcated portion being circularly curved and with depending sides adapted to embrace said instrument casing, and a bridge portion joining said side portions at the bottom of said receptacle.

2. A head bracket for cycle frames formed in a single piece and comprising a head portion having an aperture for receiving the steering column, a bifurcated portion extending rearwardly therefrom and having its bifurcated sides curved to receive a speedometer casing and converging together to form an attachment for an upper frame member extending in the same direction as the top of the bifurcated portion, and a bottom portion joined to the head portion and spaced from the bifurcated portion, said bottom portion being formed to serve as an attachment for a downwardly extending frame member, the bottom of the bifurcated portion being beveled off to permit a gasoline tank to fit within the frame and fit closely adjacent the bottom of the upper frame member and the bottom of the bifurcated portion.

In testimony whereof we have affixed our signatures.

CHARLES BAYLY FRANKLIN.
WILLIAM CHRISTIAN FRONK.